Jan. 23, 1962  O. P. WERLE  3,017,790
CUTTING TOOL AND METHOD OF MAKING SAME
Filed July 29, 1960

INVENTOR
Otto P. Werle

BY  W. O. Quesenberry
Claude Funkhouser
ATTORNEYS

3,017,790
CUTTING TOOL AND METHOD OF MAKING SAME

Otto Phillip Werle, Oxon Hill, Md., assignor to the United States of America as represented by the Secretary of the Navy
Filed July 29, 1960, Ser. No. 46,317
6 Claims. (Cl. 77—70)
(Granted under Title 35, U.S. Code (1952), sec. 266)

The invention described herein may be manufactured and used by or for the Government of the United States of America for governmental purposes without the payment of any royalties thereon or therefor.

The present invention relates to a new and improved cutting tool and the method of making the same. More specifically, the invention is directed to a method of constructing a high speed cutting tool or drill having varying cutting characteristics to suit the existing conditions during a drilling operation of pressures and surface speeds.

Briefly the invention contemplates a method of forming a cutting tool composed of cobalt steel or the like having varying cutting properties compatible with conditions existing during a drilling operation at the different radii of the axis of rotation of the cutting tool.

Accordingly, an object of the present invention is to provide a new and improved high speed cutting tool and a method of making the same.

Another object of the invention is the provision of a method of providing a cutting tool consisting of a material having high resistance to pressure and surface cutting speeds which vary from the axis of rotation to the circumferential edge of the tool.

Still another object of the invention is the provision of a method of fabricating a cutting tool by combining like metals having various cutting characteristics and toughness.

A still further object of the invention is the provision of a method of providing a cutting tool by combining cutting materials of various characteristics into a zone in which cutting and strength properties exist and which are compatible with surface feet per minute, cutting speed and feeding pressure existing or produced at various radii from the axis of rotation of either the work piece or the tool.

Other objects and many of the attendant advantages of this invention will be readily appreciated as the same becomes better understood by reference to the following detailed description when considered in connection with the accompanying drawings wherein.

Figure 1:
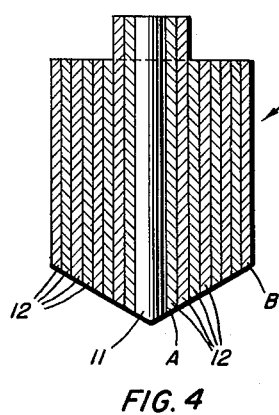
FIG. 1 is a longitudinal sectional view illustrating a fabricated body element employed in the construction of the cutting tool.
Figure 2:
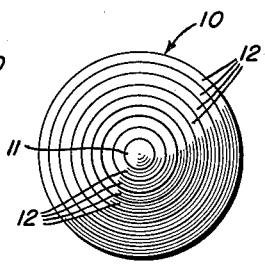
FIG. 2 is a bottom plan view of the body element of FIG. 1.

Referring to the drawings and more particularly to FIG. 1 thereof, the numeral 10 indicates a laminated body element comprising a centrally disposed core 11 having a plurality of preformed cylindrical members or sleeves 12 concentrically arranged about the core 11, the sleeves being disposed one upon the other to provide a plurality of circular walls or layers, as shown in FIG. 2. The core 11 and sleeves 12 are composed of any compositions suitable for the purpose such, for example, as cobalt carbide, cobalt steel, tungsten carbide or tantalum carbide ceramic composition. The core material is more rugged or tough than the materials of the sleeves, the sleeve material from the innermost sleeve A to the outermost sleeve B being progressively less rugged or tough with respect to each other. It will be understood that the cylindrical member or sleeve may be formed in any suitable manner such, for example, as by molding, pressure or premachining operations to provide suitable joint surfaces between the respective layers or cylindrical walls.

Figure 3:
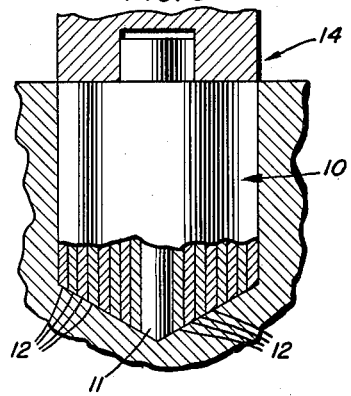
FIG. 3 is a view partially in elevation and partially in section illustrating the body element of FIG. 1 being compressed.

After the preformed sleeves 12 have been arranged about the core 11, FIG. 1, the assembly is subjected to a relatively high pressure to form a complete unit, the pressure being applied to the assembly by a conventional pressure device 14, FIG. 3.

Figure 4:
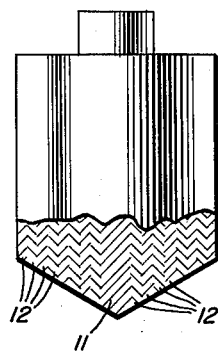
FIG. 4 is a view partially in elevation and partially in section illustrating the element of FIG. 1 after the element has been subjected to a sintering operation.

The aforesaid unit consisting of the core and circular layers is then removed from the pressure device 14 and subjected to a sintering operation whereupon the unit is transformed into a homogeneous mass or unitary element 15, FIG. 4. It will be understood that by reason of specific compositions from which the core 11 and the sleeves 12 are composed and the specific arrangement of the sleeves on the core, the element 15 constitutes a plurality of surfaces varying in strength and cutting characteristics. The element 15 is thereafter subjected to a rough grinding operation in order to smooth the surfaces thereof and also provide an element of the desired size.

Figure 5:
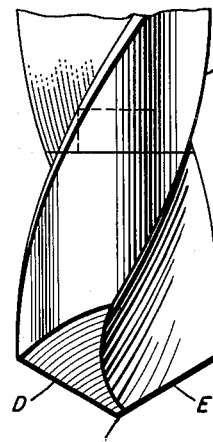
FIG. 5 is an elevation view of the body element after being conditioned and brazed to a tool shank.

The method of forming the finished tool, as illustrated on FIG. 5, will now be described. The element 15 after being rough ground to the desired size and smoothness is brazed to a toolholder 16. Thereafter the element is subjected to a grinding and a honing operation, the grinding operation being adapted to shape the element 15 in accordance with the shape of the toolholder or shank 16 and the honing operating being adapted to provide suitable cutting edges D and E on the element 15.

It is to be understood that the physical structure of the core is particularly suited for heavy wear and impact applications and the physical structure of the sleeves are particularly suited to provide optimum cutting action to various points along the cutting edges D and E. Moreover, the physical structure of the core serves to prevent chipping and excessive wear of the drill point C, and is highly resistant to pressure and variable surface cutting speeds. The physical structure of the sleeves are admirably suited for their respective surface cutting speeds, such, as feet per minute.

Figure 6:
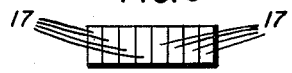
FIG. 6 is a bottom plan view illustrating an alternate arrangement of the body element of FIG. 1.
Figure 7:
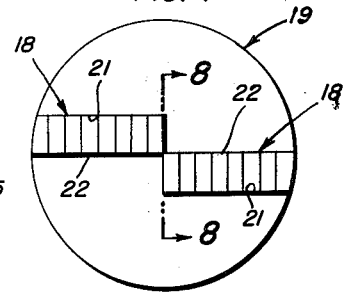
FIG. 7 is a bottom plan view of the device of FIG. 6, attached to a tool shank.
Figure 8:
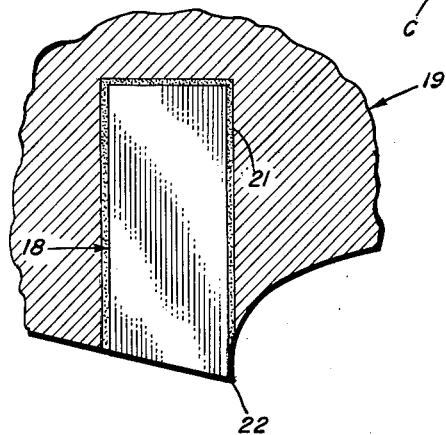
FIG. 8 is a sectional view taken on the line 8—8 of FIG. 7.

Referring now to FIGS. 6 through 8, an alternate arrangement of the device of FIG. 5 will be described. In this arrangement and, as illustrated in FIG. 6, a plurality of substantially oblong members 17 are employed in lieu of the cylindrical sleeves 12. It will be understood that the physical characteristics of the members 17 are comparable to those of the cylindrical sleeves 12. The members 17 are subjected to conditioning operations comparable to the conditioning operations to which the unit of FIG. 1 is subjected, such, as the compressing, sintering, grinding and honing operations.

During the sintering operation the members 17 are transformed into a homogeneous mass or element 18, two of such elements being illustrated in FIG. 7, in connection with a toolholder or shank 19. Each of the elements is disposed within a recess or slot 21 formed in the end of the shank 19 and secured therein, as by brazing, for example. The aforesaid elements 18 extend outwardly from the end of the shank 19 and are provided with a cutting edge 22, highly efficient and long-wearing spade type cutting tool and method of making the same has been devised.

Although the invention is directed to drilling tools and the method of making the same, it is to be understood that by this method it is possible to make various types of machine cutting tools such, for example, as end milling, spot facing and boring tools. Moreover, although the preformed elements are disclosed as being either cylindrical or oblong, it is to be understood that various shaped preformed elements may be employed such, for example, as segments, flats and the like.

Obviously many modifications and variations of the present invention are possible in the light of the above teachings. It is therefore to be understood that within the scope of the appended claims the invention may be practiced otherwise than as specifically described.

What is claimed is:

1. A method of forming a cutting tool and comprising the steps of assembling a plurality of preformed circular walls concentrically about a core member in telescoping and abutting relationship and having varying cutting characteristics, subjecting the walls and member to a sintering operation to provide a homogeneous mass containing a plurality of circular surfaces according to the varying cutting characteristics of the walls, grinding the mass to the desired shape, and thereafter honing the mass to provide suitable cutting edges thereon.

2. A method of forming a cutting tool and comprising the steps of assembling a plurality of preformed circular walls concentrically about a core member in telescoping and abutting relationship, compressing the walls and member to provide a unitary body, subjecting the body to a sintering operation to provide a homogeneous mass containing a plurality of circular surfaces according to the varying cutting characteristics of the walls, grinding the mass to the desired shape, and thereafter honing the mass to provide suitable cutting edges thereon.

3. A method of forming a high speed drill characterized by high resistance to pressure and variable surface speeds, said method comprising the steps of assembling a plurality of preformed circular walls composed of material having varying cutting characteristics concentrically about a core member in telescoping and abutting relationship, compressing the walls and member to provide a unitary body, subjecting the body to a sintering operation to provide a homogeneous mass containing a plurality of circular surfaces according to the varying cutting characteristics of the walls, rough grinding the body to the desired size, additionally grinding the mass to the desired shape, and thereafter honing the mass to provide suitable cutting edges thereon.

4. A method of forming a high speed drill characterized by high resistance to pressure and variable surface speeds, said method comprising the steps of assembling a plurality of preformed circular walls concentrically about a core member in telescoping and abutting relationship and having varying cutting characteristics, compressing the walls and member to provide a unitary body, subjecting the body to a sintering operation to provide a homogeneous mass consisting of a plurality of circular surfaces according to the varying cutting characteristics of the walls, rough grinding the body to the desired size, permanently attaching the mass to a preformed toolholder, additionally grinding the mass to the desired shape and in accordance with the shape of the toolholder, and thereafter honing the mass to provide suitable cutting edges thereon.

5. A method of forming a high speed drill from a plurality of metallic circular walls each of which are of varying physical and cutting characteristics, said method comprising the steps of assembling the walls one upon the other in telescoping and abutting relationship, compressing the elements to provide a unitary assembly, subjecting the assembly to a sintering operation to provide a homogeneous mass having circular surfaces according to the varying physical and cutting characteristics of the walls, attaching the mass to a preformed toolholder, grinding the mass to the desired shape and in accordance with the shape of the toolholder, and thereafter honing the mass to provide a plurality of circular cutting surfaces characterized by varying physical and cutting properties.

6. A cutting tool comprising a homogeneous mass composed of a centrally disposed core, a plurality of circular walls in telescoping and abutting relationship, each wall including the core composed of a material having varying physical and cutting characteristics with respect to each other, a plurality of circular cutting surfaces on said mass and corresponding to the varying physical and cutting characteristics of the core and each circular wall, and a toolholder for supporting said mass.

References Cited in the file of this patent

UNITED STATES PATENTS 2,858,718    Kohler _____ Nov. 4, 1958